April 21, 1931.  H. I. RICHARDS ET AL  1,802,273
PLANT SETTER
Filed June 6, 1928   3 Sheets-Sheet 3

Inventor
H. I. Richards,
I. M. M°Williams,
By Haspell + Leech
Attorneys

Patented Apr. 21, 1931                                                                1,802,273

UNITED STATES PATENT OFFICE

HENRY I. RICHARDS, OF BOSTON, AND IRWIN K. McWILLIAMS, OF NORTH GRAFTON, MASSACHUSETTS

PLANT SETTER

Application filed June 6, 1928. Serial No. 283,414.

The present invention relates to a machine for setting plants such as tobacco, cabbage, tomato plants, etc. in the earth.

An object of the invention is to provide a machine for setting plants in the earth so that they will be accurately and uniformly spaced apart.

Another object of the invention is to provide such a machine which requires a minimum of manual labor.

Another object of the invention is to provide a machine by means of which the plants may be set in the earth at relatively great speed.

A further object of the invention is to provide a machine which automatically distributes the roots of the plant over a relatively great area in the soil.

A further object of the invention is to provide a machine having means for opening a furrow before the plant is set and for closing the furrow after the plant is set, said machine providing means for watering the plant as it is placed in the soil.

Further objects of the invention will appear from the following description taken in connection with the accompanying drawings, which illustrate by way of example a preferred embodiment of the invention and in which.

Figure 1:
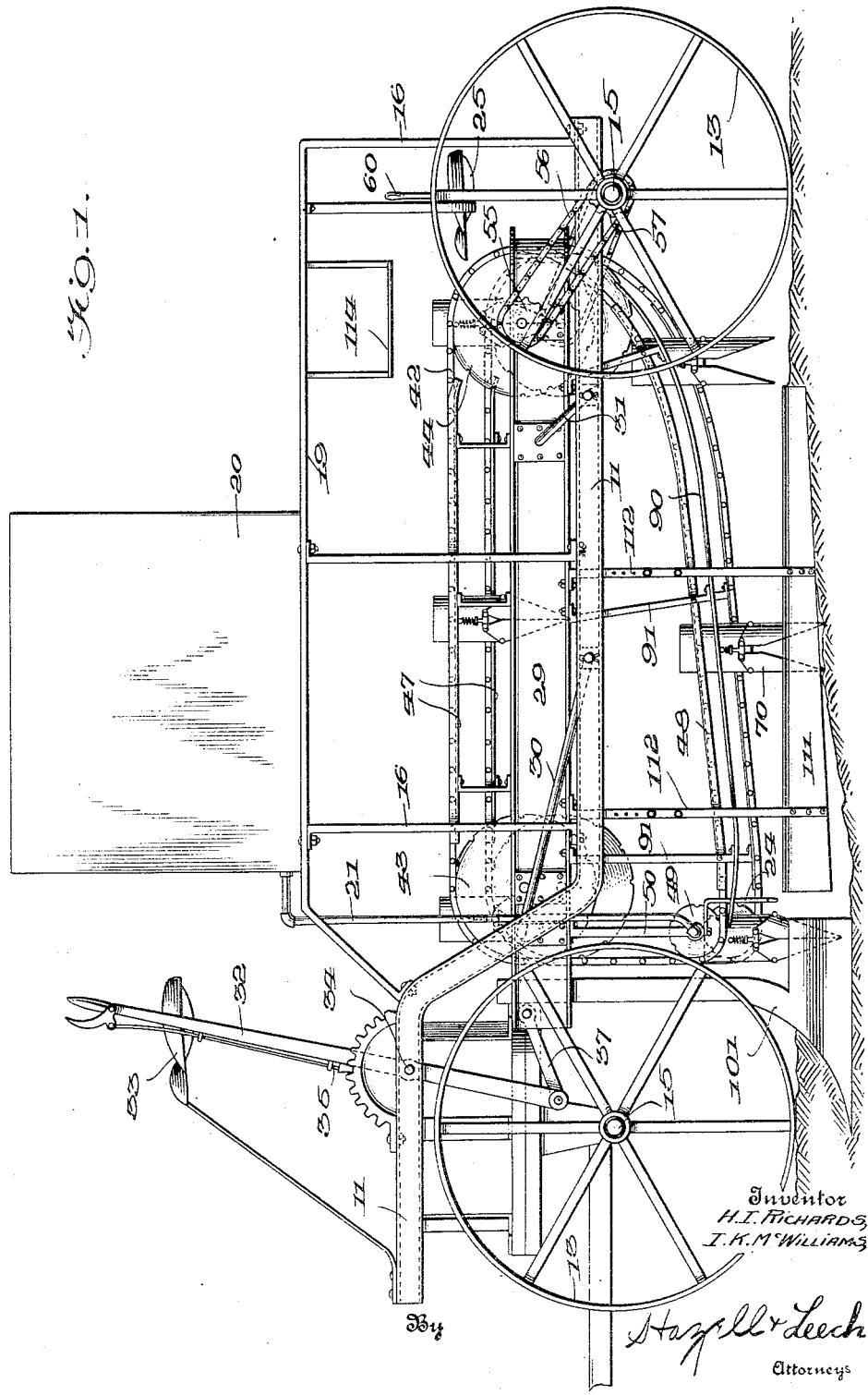
Fig. 1 is a side elevation of one form of machine embodying the present invention.
Figure 2:
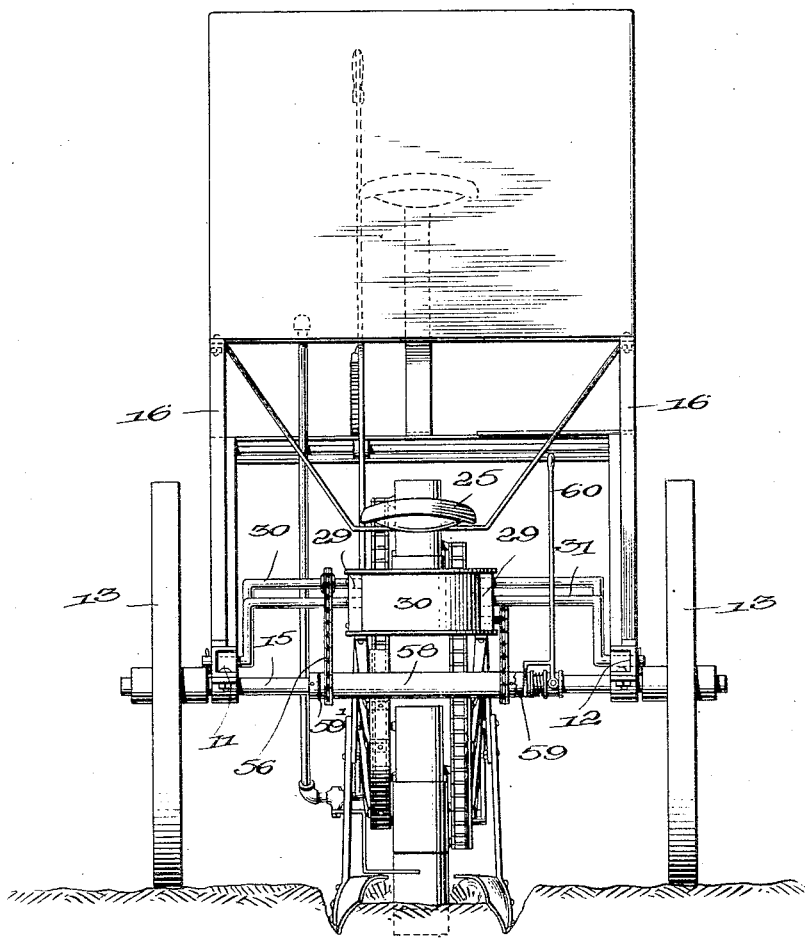
Fig. 2 is a rear elevation thereof.

Referring in detail to the drawings, a framework is provided which includes two spaced longitudinally extending members 11 and 12 connected together at their ends and mounted on wheels 13, the wheel frame being adapted to be drawn by horse or tractor. The axles 15 are preferably cylindrical and rotatable, and the wheels 13 rotate with their axles and are preferably slidably secured thereon to permit their adjustment to vary the width of the wheel track so that the machine may be adjusted for working between neighboring rows without crushing any plants that may have been set in the row adjacent the one being planted.

Supported by vertically extending frame members 16 upon the members 11 and 12 is the upper horizontal frame 19, upon which is mounted a water tank 20 provided with a downwardly extending pipe line 21 provided with an open lower end 22 located over the lower path of the plant buckets hereinafter described and adapted to deliver a supply of water to the plant in each bucket at the moment it is deposited in the furrow. The pipe line 21 is provided with a cock 23 controlled by a lever 24 adapted to be moved by the traveling buckets at the proper moment to deliver to the buckets momentarily a supply of water. The cock 23 is preferably spring controlled for the purpose of returning the lever 24 to closing position so that it may again be opened by the next bucket.

A seat 25 or a plurality of seats may be secured to the upper frame work, for example upon the uprights 16, to accommodate one or more operators whose duty it is to insert a plant in each bucket as it travels past the operators along the conveyor.

Carried by the wheel frame above described is a vertically adjustable bucket conveyor frame composed of longitudinally extending parallel members 29, which are preferably connected at their ends by a cross reach 30. The conveyor frame is movably carried on the wheel frame by front and rear links 30 and 31 pivoted at their lower ends to the wheel frame and at their upper ends to the conveyor frame. The conveyor frame 21 is raised or lowered by a hand lever 32 adjacent the driver's seat 33 and pivoted at 34 to the wheel frame and held in adjusted position by any suitable form of ratchet 35.

The lower end of the lever 32 is connected by a link 37 to the forward end of the conveyor frame, and forward motion of the lever 32 causes the conveyor frame to ride upwardly and rearwardly on the links 30 and 31, thereby increasing its height above the ground, and facilitating withdrawal of the plow from the ground and lowering it therein to operative position. The conveyor frame is lowered by lever 32 for the planting operation and at other times is carried on the wheel frame in upper position, so that the mechanism hereinafter referred to will ride clear of the ground surface.

The invention provides conveyor mechanism for carrying the plants to planting position, and means are provided for maintaining the plant in upright position in its row while it is watered and while sufficient earth is packed around the plant to insure its stability.

In the form of the invention herein shown, the conveyor mechanism includes a pair of spaced apart endless chains or belts 42 each passing over a forward conveyor wheel 43 and a rear driven conveyor wheel 44. The conveyor wheels are mounted to rotate freely on their respective arbors mounted in and extending between the spaced side reaches 29 of the conveyor frame. Fixed rests 47 are provided to support slidably the upper reaches of the conveyor chains or belts 42, and fixed guides 48 bear upon the lower reaches of the conveyor chains to guide them in a predetermined path for a purpose presently to be described. Idle guide rollers 49 are rotatably mounted on depending brackets 50 to guide the forward lower end of the conveyor chains.

The driving conveyor wheels 44 are preferably driven from the rear axle, and, in the form of the invention herein shown, each rear driving conveyor wheel 44 is provided with a pinion 55 connected by a chain 56 with a sprocket 57 carried on a clutch sleeve 58 freely and rotatably mounted on the rear axle 15. A clutch collar 59 is non-rotatably mounted on the rear axle 15 and is provided with annular ratchet teeth or other suitable means for engagement with the clutch sleeve 58, which abuts against the collar 59' fixed on the rear axle. The movable collar is shifted axially by a clutch lever 60 to effect engagement or disengagement of the sleeve 58 with the driving clutch collar 59. The clutch lever 60 extends upwardly and adjacent to the seat 25 above described.

Figure 3:
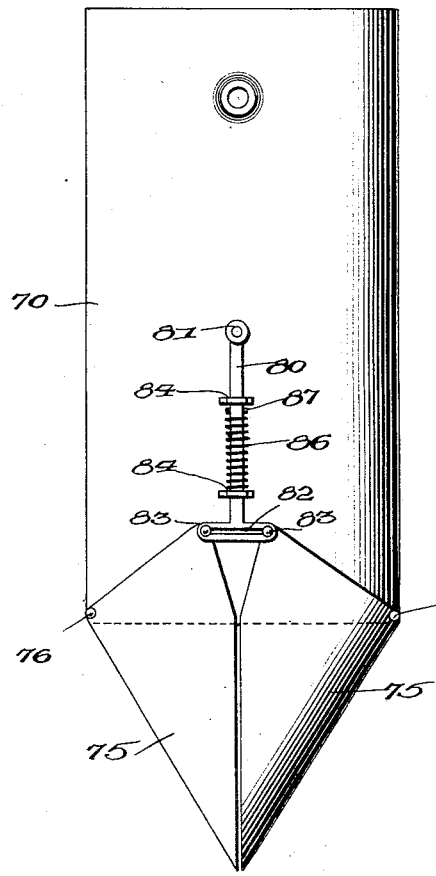
Fig. 3 is a side elevation of one of the plant distributing buckets, on an enlarged scale.
Figure 4:
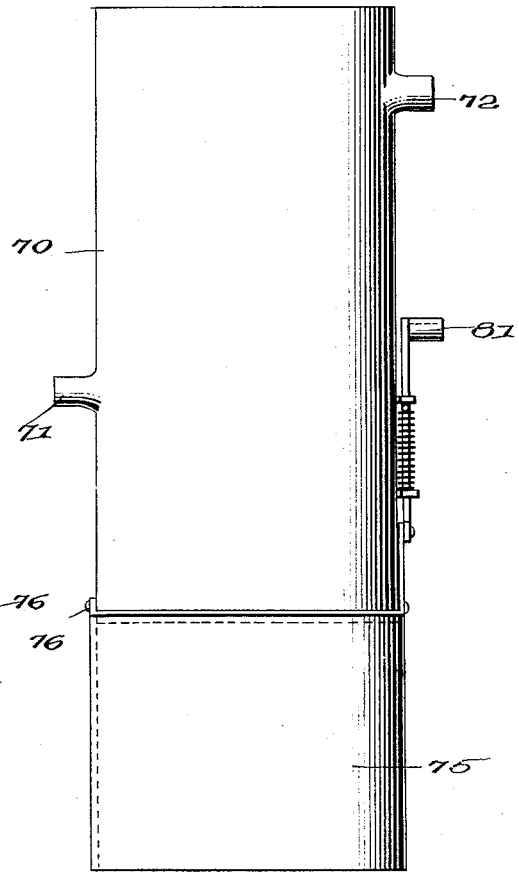
Fig. 4 is an end elevation thereof.
Figure 5:
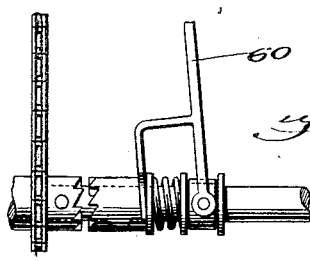
Fig. 5 is a detail view in elevation of a portion of the clutch and clutch lever.
Figure 6:
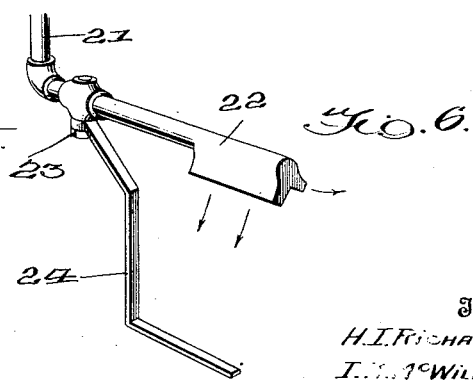
Fig. 6 is a perspective view of the water faucet and actuating mechanism.

Mounted on and located between the two conveyor chains 42 are a plurality of plant buckets 70, which are preferably constructed as shown in Figs. 3 and 4, each being provided with a lower lug 71 and an upper lug 72 opposite thereto, the lower lug being secured to the lower conveyor chain 42, and the upper lug being secured to the upper chain. The conveyor buckets 70 are thereby always maintained and carried in upright position.

At the lower end of each bucket two oppositely acting closure members 75 are provided, and these are preferably pivoted, as at 76, to the lower portion of the conveyor bucket. These closure members are in the form of movable jaws normally maintained in the closed position of Fig. 3 to receive and carry the plant, and gradually open at a predetermined point to release the plant gradually from its bucket and support it in the furrow until sufficient earth has been packed around its roots to support the plant without assistance.

As herein shown, the bucket opening means includes an inverted T-shaped bar 80 provided at its upper end with a horizontally outwardly extending actuating lug 81, and the lower or horizontal portion of the T-shaped bar 80 is slotted, as at 82, for the reception of a pair of pins 83 projecting from the upper edges of the closure members 75. A pair of T bar guides 84 are fixed on the bucket 70, and the bar 80 reciprocates therein, being normally maintained in its uppermost position by a coil spring 86 encircling the T bar and bearing at its lower end against the lower lug 84 and at its upper end against the cross pin 87 fixed in and projecting from the T bar 80. By this construction, when a downward force is applied to the T bar lug 81, the bar is forced downwardly and the closure members 75 are moved about their pivots 76 to open the bucket and release the plant so that it is supported in its furrow. As the bucket opens, dirt falls in around the lower part of the plant while it is held upright by the sides of the bucket. These sides also protect the tops of the plants from being covered with soil.

A bucket-opening track member 90 is provided adjacent the lower reach of the conveyor chains, as shown in Fig. 1, and is carried by the conveyor frame 29 by means of downwardly extending brackets 91, whose upper ends are fixed to said frame. The track 90 extends in the path of travel of the lugs 81 of successive plant buckets and is so shaped as to exert increasing pressure for a short distance on each of said lugs in succession and thereby to move the T bar 80 gradually downwardly in order gradually to open each plant bucket in turn.

A plow share 101 is carried by the forward end of the conveyor frame and may be shaped as shown in Fig. 7, the essential feature being that it opens a furrow but does not turn the earth over on either side, thereby allowing the earth to fall back into place again as the plow share moves forward.

The plow share is preferably provided with two sides spaced apart to permit successive plant buckets to pass between them, as shown in Fig. 1, just prior to the horizontal movement of the buckets. The buckets travel twice as fast as the wheel frame in their upper positions with the upper reach of the conveyor and have no longitudinal travel with respect to the ground in their lower positions, but merely a gradual upward movement, as illustrated in Fig. 1, due to the upward slope of the conveyor chains. This causes the gradual lifting of the bucket off the plant.

While the bucket is being lifted off the plant, the soil which has fallen back into the furrow by gravity after sliding off the plow share is packed gradually around the deposited plant on each side thereof by a pair of soil packers 111 extending longitudinally of the conveyor chain and located one on each side of the lower path of the plant buckets. These soil packers are preferably considerably curved at their forward end, which curvature decreases towards the rear end of the soil packers, at which end they approach horizontal position. The soil packers are preferably adjustably carried at the lower ends of depending adjustable arms 112 secured at their upper ends to the conveyor frame. To transport the planter in inoperative position, the conveyor frame is raised by lever 32 and this raises the plow share, conveyors, buckets and soil packers clear of the ground.

In operation, the operator occupying the seat 25 is provided with a supply of plants which may be carried on the plant shelf 114, and, with the conveyor driving clutch thrown in, he deposits one of these plants in each bucket as it passes before him carried by the conveyor chains. When a bucket reaches its forward lower position between the plow sides, it is gradually opened by the track 90, which engages the bucket-opening lug 81, and as the bucket is opened, it strikes the lever arm 24 and opens the faucet 23 to supply the roots of the plant with water from the tank 20. Due to the upward slope of the lower reach of the conveyor, the bucket is gradually lifted off the plant, and at the same time the soil which has fallen about the plant off the plow sides is packed gradually around the plant sufficiently to support it by the time the bucket reaches the position of the rearmost bucket in Fig. 1. Thus, as the bucket is opened, both soil and water flow in around the roots of the plant, while the bucket holds the plant upright and shields the top of the plant. The water from the tank 20 is directed against the inner sides of the bucket, down which it flows to the roots of the plant while soil also is falling in about the roots. As soon as the bucket passes beyond the track 90, the bucket is closed by upward movement of the T bar 80 due to coil spring 86 and is in position to receive another plant.

Depending on the length of the conveyor and the distance apart thereon of the buckets, two, three or more plants may be in process of setting simultaneously. It is also pointed out that by mere duplication of the conveyor the machine is capable of acting as a multi-row plant setter, and that by decreasing or increasing the number of buckets on the conveyor the distance apart of the plants in the row may be varied as may be desired.

From the foregoing description it will be seen that the invention provides a plant setting machine which accomplishes the objects above stated, and it will also be seen that various changes and modifications may be made in the mechanism as here described without departing from the invention as defined by the following claims.

What is claimed is:

1. A plant setting machine including a wheeled frame, means for opening a furrow, an endless chain having one run above another, open-topped buckets having movable bottom closures and carried by said chain in constantly upright position, means for opening said buckets successively to deposit plants in the furrow, means for delivering a supply of water to each plant as it is deposited, and means for packing earth in the furrow around each plant.

2. A plant setting machine including a wheeled frame, means for opening a furrow, an endless chain having one run above another, a plurality of open-topped, bottom-opening buckets carried thereby in constant vertical position, means for opening successive buckets on the lower run of said belt to deposit plants in said furrow, means for packing earth in the furrow around each plant, and means vertically movable on said wheeled frame for carrying said furrow-opening, depositing and packing means.

3. A plant setting machine including a wheeled frame, means for opening a furrow, a plurality of open-topped plant containers having movable bottom closures, a pair of spaced conveyors carrying said containers in constantly upright position, tripping means for opening said containers successively and gradually to deposit plants in the furrow, and means for packing earth in the furrow around each plant, each of said containers supporting its plant during operation of said packing means.

4. A plant setting machine including a wheeled frame, means for opening a furrow, a plurality of plant containers having pivoted bottom closures and movable in an upwardly sloping path, tripping means for opening said closures successively and gradually to deposit plants in the furrow, and means for packing earth in the furrow around each plant, said tripping means cooperating therewith to hold each container open as it is gradually moved upwardly off its deposited plant.

5. A plant setting machine including a wheeled frame, means for opening a furrow, a plurality of plant containers having pivoted bottom closures, a tripping plate for opening said closures successively to deposit plants in the furrow, said tripping plate holding said closures open during packing of earth around the plants, and means including a pair of spaced curved members for packing earth in the furrow around each plant.

6. A plant setting machine including a wheeled frame, means for opening a furrow, means including a plurality of open-topped traveling plant containers having movable bottom closures for depositing plants in the furrow, means called into action by successive plant containers for supplying a quantity of water to each plant as it is deposited in the furrow, and means for gradually packing earth in the furrow around each deposited plant.

In testimony whereof we affix our signatures.

HENRY I. RICHARDS.
IRWIN K. McWILLIAMS.